US008699456B2

(12) United States Patent
Smadi et al.

(10) Patent No.: US 8,699,456 B2
(45) Date of Patent: Apr. 15, 2014

(54) METHODS AND APPARATUS FOR USE IN IMPROVING NETWORK COVERAGE FOR VOICE OR DATA CALLS

(75) Inventors: Mohammed Nawaf Smadi, Ancaster (CA); Michael Peter Montemurro, Toronto (CA)

(73) Assignee: BlackBerry Limited, Waterloo (CA)

( * ) Notice: Subject to any disclaimer, the term of this patent is extended or adjusted under 35 U.S.C. 154(b) by 696 days.

(21) Appl. No.: 12/912,538

(22) Filed: Oct. 26, 2010

(65) Prior Publication Data

US 2012/0099562 A1  Apr. 26, 2012

(51) Int. Cl.
*H04W 4/00* (2009.01)
*H04W 36/00* (2009.01)

(52) U.S. Cl.
USPC ........................................... 370/331; 455/436

(58) Field of Classification Search
USPC .......................................................... 370/331
See application file for complete search history.

(56) References Cited

U.S. PATENT DOCUMENTS

| | | | |
|---|---|---|---|
| 6,781,971 | B1 | 8/2004 | Davis et al. |
| 7,466,991 | B2 | 12/2008 | Everson et al. |
| 7,574,212 | B2 | 8/2009 | McConnell et al. |
| 2004/0114553 | A1 | 6/2004 | Jiang et al. |
| 2004/0266426 | A1 | 12/2004 | Marsh et al. |
| 2005/0053034 | A1* | 3/2005 | Chiueh .......................... 370/331 |
| 2005/0070288 | A1 | 3/2005 | Belkin et al. |
| 2005/0239497 | A1 | 10/2005 | Bahl et al. |
| 2005/0286466 | A1 | 12/2005 | Tagg et al. |
| 2006/0039360 | A1 | 2/2006 | Thawani et al. |
| 2006/0056448 | A1* | 3/2006 | Zaki et al. ........................ 370/466 |
| 2006/0111112 | A1 | 5/2006 | Maveddat |
| 2007/0076664 | A1 | 4/2007 | An et al. |
| 2007/0091907 | A1 | 4/2007 | Seshadri et al. |
| 2008/0101318 | A1 | 5/2008 | Taaghol et al. |
| 2008/0102843 | A1* | 5/2008 | Todd et al. ........................ 455/445 |

(Continued)

FOREIGN PATENT DOCUMENTS

| | | |
|---|---|---|
| EP | 1263254 A2 | 12/2002 |
| EP | 1480385 A3 | 11/2008 |

(Continued)

OTHER PUBLICATIONS

Mary Narisetti, "Implementation Of Vertical Handoff Algorithm Between IEEE802.11 WLAN And CDMA Cellular Network", Aug. 2006.

(Continued)

*Primary Examiner* — Shaq Taha
(74) *Attorney, Agent, or Firm* — Perry + Currier Inc.

(57) ABSTRACT

To improve network coverage or reduce false handover triggering, at least one client terminal is set to operate as a virtual access point (VAP) in a first wireless network by an AP controller. If a mobile device detects that a signal quality estimate of communications via an AP of the first wireless network is below a first value, the mobile device performs a handover procedure to the VAP. While maintaining the call via the VAP, if the mobile device detects that the signal quality estimate is back above the first value, the mobile device performs a handover procedure back to the AP of the first wireless network. On the other hand, if the mobile device detects that the signal quality estimate is below a second value which is less than the first value, the mobile device performs a vertical handover procedure from the VAP to a base station of a second wireless network.

20 Claims, 6 Drawing Sheets

(56) References Cited

U.S. PATENT DOCUMENTS

| | | |
|---|---|---|
| 2009/0010226 A1 | 1/2009 | Nishimura et al. |
| 2009/0141685 A1 | 6/2009 | Berglund |
| 2009/0141694 A1 | 6/2009 | Shi |
| 2009/0143026 A1 | 6/2009 | Jaffri et al. |
| 2010/0165879 A1 | 7/2010 | Gupta et al. |
| 2012/0106514 A1* | 5/2012 | Zheng et al. .......... 370/331 |

FOREIGN PATENT DOCUMENTS

| | | |
|---|---|---|
| EP | 2169997 A1 | 3/2010 |
| WO | 0122764 A1 | 3/2001 |
| WO | 2005011182 A2 | 2/2005 |

OTHER PUBLICATIONS

Gabe Conradi, "Current Status And Overview Of The CAPWAP Protocol", pp. 1-20, Aug. 17, 2010.

Calhoun et al., "Control And Provisioning Of Wireless Access Points (CAPWAP) Protocol Binding For IEEE 802.11", pp. 1-71, Mar. 2009.

Khadivi E Al., "Dropping Rate Reduction In Hybrid WLAN/Cellular Systems By Mobile Ad Hoc Relaying", pp. 515-542, vol. 39, Dec. 2006.

European Search Report and Written opinion for EP patent Application # 12188165.0, Dec. 3, 2012.

European Search Report & Written Opinion for EP Application# 10189588.6, Jan. 14, 2011.

\* cited by examiner

METHODS AND APPARATUS FOR USE IN IMPROVING NETWORK COVERAGE FOR VOICE OR DATA CALLS

BACKGROUND

1. Field of the Technology

The present disclosure relates generally to radio communications, and more particularly to techniques for improving network coverage for voice or data calls, such as for reducing false triggering of "vertical" handovers of voice or data calls between wireless networks.

2. Description of the Related Art

The present disclosure relates generally to handover methods and apparatus between heterogeneous wireless networks, such as wireless local area networks (WWANs) (e.g. IEEE 802.11 based networks) and wireless wide area networks (WWANs) (e.g. cellular telecommunication networks), for mobile communication devices. The specific problem addressed relates to the support of real-time voice calls (or other media communications) when "multi-mode" devices are utilized in enterprise network environments.

It is desirable for such mobile communication devices to be handed over reliably and seamlessly from one wireless network (e.g. WLAN) to another wireless network (e.g. WWAN) when necessary. A handover between two different types of wireless networks, such as WLANs and WWANs, may be referred to as a "vertical" handover.

To properly implement such handover, the mobile device should be equipped with a reliable signal quality detection mechanism which can detect when the signal quality of the current wireless network is becoming poor. If so, the mobile device can be handed over to the other wireless network in an expedient fashion, so that a communication session of the mobile device can be seamlessly maintained. If the mobile device can quickly detect that it is being moved away from and leaving the current wireless network (e.g. the signal quality is quickly becoming poor), it can establish a connection with the other wireless network before its connection with the current wireless network is lost. On the other hand, if the mobile device operates to act too quickly in response to a brief temporary degradation in signal, a false triggering for such handover may undesirably occur. Thus, it is important to achieve the right balance in the mobile device's response to signal conditions in the current wireless network. It is further desirable that the mobile device operate in a manner that reduces power consumption.

What are need are methods and apparatus which overcome these and other related or similar shortcomings of the prior art.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

According to the present disclosure, methods and apparatus in a mobile communication device for use in improving network coverage for voice or data calls, such as for reducing false triggers for vertical handover between first and second wireless networks, are provided. For this purpose, at least one client terminal is set to operate as a virtual access point in the first wireless network by an AP controller. When serving as the virtual access point, such client terminal may be configured for peer-to-peer (P2P) communications and be bridged to the first wireless network. In one embodiment, the client terminal is set as the virtual access point by the AP controller in accordance with the Control and Provisioning of Wireless Access Points (CAPWAP) protocol. The client terminal serving as the virtual access point may be configured to perform mesh networking functions, such as pathfinding/discovery and bridge/routing updating functions. Such client terminal may be further operative in accordance with WiFiDirect standards, or IEEE 802.11s standards.

In the technique, if the mobile device detects that a signal quality estimate of communications via an access point of the first wireless network is below a first quality threshold value, then the mobile device performs a handover procedure for handing over the call to the virtual access point which is bridged to the first wireless network. While maintaining the voice or the data call via the virtual access point, if the mobile device detects that the signal quality estimate is back above the first quality threshold value, then the mobile device performs a handover procedure for handing over the call back to the access point of the first wireless network. On the other hand, if the mobile device detects that the signal quality estimate is below a second quality threshold value which is less than the first quality threshold value, then the mobile device performs a vertical handover procedure for handing over the call from the virtual access point of the first wireless network to a base station of the second wireless network.

Figure 1:
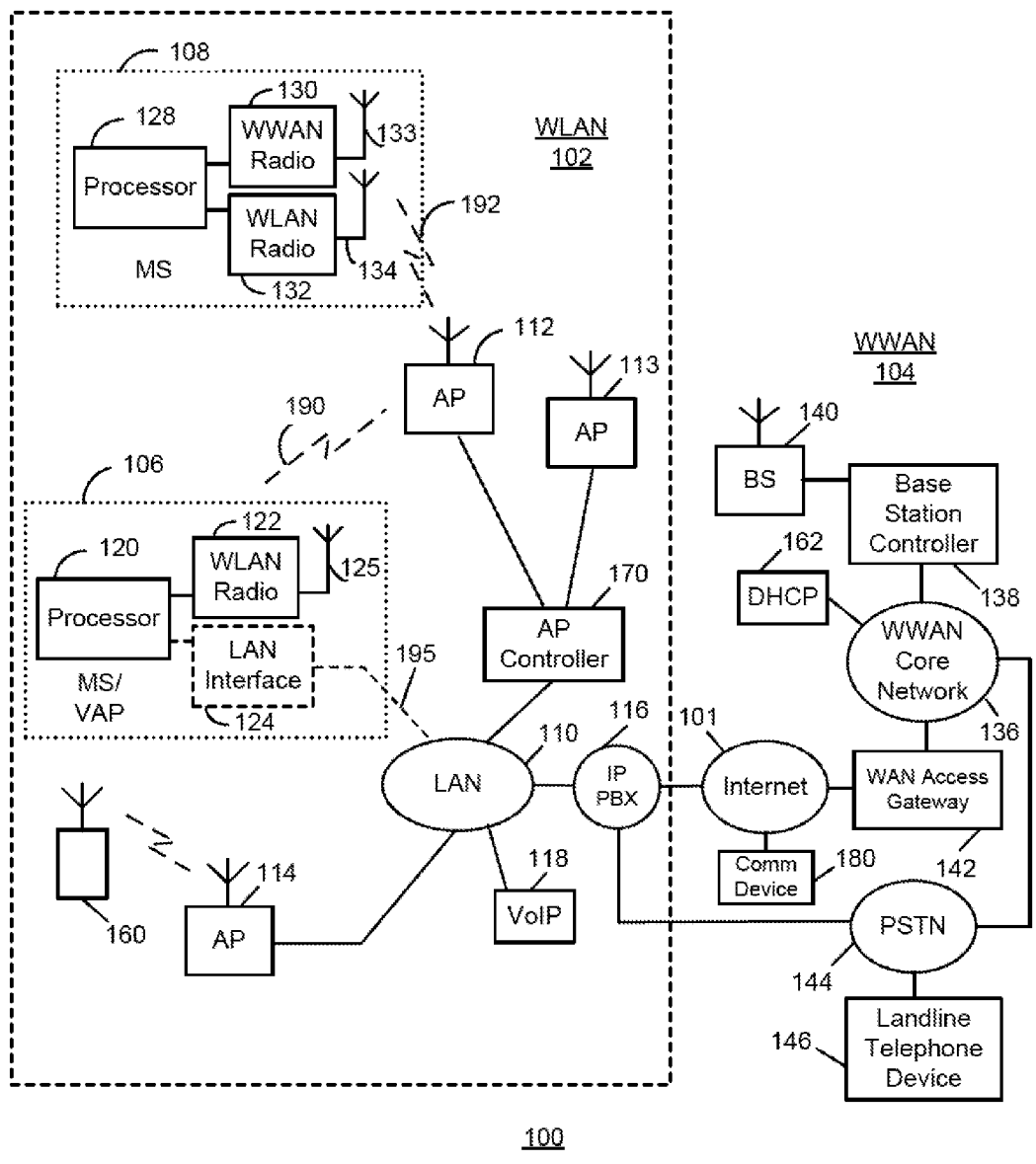
FIG. 1 is an illustrative representation of a communication system which includes a wireless local area network (WLAN) of a LAN and a wireless wide area network (WWAN) of a WAN, wherein a client terminal in the WLAN also operates as a virtual access point and is bridged to the WLAN for facilitating the switching of communication operations between the WLAN and the WWAN for a mobile communication device.

To illustrate basic network architecture for the present techniques, FIG. 1 is an illustrative representation of a communication system 100 which includes a wireless local area network (WLAN) 102 and a wireless wide area network (WWAN) 104. In the embodiment described, WLAN 102 is an IEEE 802.11-based WLAN and WWAN 104 is a cellular telecommunications network. WLAN 102 may be part of a communication network such as a local area network (LAN) 110. In this embodiment, LAN 110 is part of a private communication network which may be referred to as an enterprise network of an enterprise having a gateway which may include a firewall. Communications between LAN 110 and WWAN 104 may be facilitated via a connecting network such as a broadband IP network such as the Internet 101.

Client terminals (or "STAB") may connect to LAN 110 through any suitable means, such as through a plurality of wireless access points (APs) of WLAN 102. FIG. 1 shows three wireless APs of WLAN 102, namely, a wireless AP 112, a wireless AP 113, and a wireless AP 114, although WLAN 102 may include any suitable number of such APs. Such client terminals and wireless APs operate in accordance with well-known IEEE 802.11 standards. APs include wireless radios, serve as end points of the network, and communicate directly with wireless client terminals.

At least some of the wireless APs in WLAN 102, such as wireless APs 112 and 113, may be connected to WLAN 102 through a network entity which may be referred to as an AP controller 170. These APs may include processing logic other than radio functionality, but the extent of such logic is governed by the medium access control (MAC) architecture of the AP. In this regard, there are different types of APs. For one, "thick APs" (i.e. local MAC implementations) perform all necessary data processing and relaying locally (i.e. within the AP). On the other hand, "thin APs" (i.e. or remote MAC implementations) typically include only physical (radio) layer processes, and communicate via a proprietary protocol with the AP controller. Here, the AP's 802.11 MAC layer is implemented on the AP controller, so all frames sent by the AP are processed by the AP controller and forwarded on as if the MAC layer in the AP controller was that of the AP. Finally, "fit APs" have gained popularity in recent years, as they combine both the intelligence of a local MAC implementation with the agility of a remote MAC implementation, by splitting real-time and non-real-time functionality between the AP and the AP controller.

AP controller 170 is configured to manage and configure APs in WLAN 102, and may also serve as a router. In one centralized architecture embodiment, one or more AP controllers (e.g. AP controller 170) manage a set number of deployed APs. The APs retrieve configuration from their AP controller, and report their status back to the AP controller for management purposes. In a typical usage case, data from an AP is tunneled back to its AP controller for processing, and sent onto the back haul network. Here, the AP controller serves as a router, receiving and processing layer-2 frames and switching layer frames onto the access network. The AP controllers may also provide Simple Network Management Protocol (SNMP) data regarding its associated APs, or other types of monitoring information, such as graphs of traffic data, or numbers of associated users.

In general, AP controllers (such as AP controller 170) are configured for discovering, authenticating, and registering wireless APs, as well as maintaining a service channel to communicate over. More specifically, AP controllers perform particular functions which may include AP discovery, authentication, association, firmware distribution, traffic management, and configuration. AP discovery allows an AP controller to take ownership of an AP or redirect control to another AP controller. The AP controller may then authenticate the AP and negotiate its advertised capabilities (e.g. such as an 802.11a, b, g, or n capability, OFDM (Orthogonal Frequency Division Multiplexing) capability, encoding capability, RF transmit and receive power capability, and more. The AP controller then authenticates the AP, and begins uploading firmware to the AP which is used to program the AP's radio capabilities. During such initialization, as well as during operation, periodic control messages are exchanged between the AP and the AP controller, for management and statistical purposes. The AP controller opens a channel to the AP which stays open during AP operation. Finally, configuration takes place and the AP is set into active mode.

Note that such functions may be governed by and performed in accordance with the Control and Provisioning of Wireless Access Points (CAPWAP) protocol. In general, CAPWAP is currently defined in Request For Comments (RFC) 5415 and 5416, and specifies a protocol for use between access points (or more generically, wireless terminal points or WTPs) and their associated AP controller. In the present case, the CAPWAP protocol extends to virtual access points which may be client terminals of a WLAN.

Referring back to FIG. 1, communication devices 108 and 160 which operate in WLAN 102 are client terminals such as mobile communication devices/mobile stations (MSs)/mobile handheld devices/wireless handsets of the dual-mode type, having both WLAN and WWAN radio interfaces. For example, communication device 108 is shown to have one or more processors 128, a WLAN radio interface 132 coupled to an antenna means 134, and a WWAN radio interface 130 coupled to an antenna means 133. Communication device 108 is shown to be associated with and communicating via wireless AP 112 over a wireless link 192, whereas communication device 160 is shown to be associated with and communicating via wireless AP 114.

LAN 110 which includes WLAN 120 provides various data and communication services to its terminals. For example, LAN 110 may provide for voice telephony communication services for its terminals with use of Voice over IP (VoIP) communications. For such services, LAN 110 may utilize servers such as a VoIP type server 118 or at least one session server which is a session initiation protocol (SIP) server. Today, communication applications, such VoIP applications, for terminals require the use of SIP. SIP is well-documented in standard documents such as Request For Comments (RFC) 3261. An IP Public Branch Exchange (IP-PBX) controller or equipment 116, which may be more generally referred to as a gateway, is provided and coupled to LAN 110 for interfacing with both Internet 101 and Public Switched Telephone Network (PSTN) 144. IP-PBX controller 116 is adapted to facilitate calls with other telephone equipment such as a communication device 180 (which may be referred to as a called node or CN) in Internet 101 and/or a landline telephone device 146.

WWAN 104 which may be the cellular telecommunications network includes a WWAN core network 136, a plurality of base station controllers such as a base station controller (BSC) 138 coupled to WWAN core network 136, and a plurality of base stations such as a base station (BS) 140 coupled to associated BSCs 138. WWAN core network 136, BSC 138, and BS 140 operate primarily in accordance with conventional telecommunication techniques. An address assigning component, such as a Dynamic Host Configuration Protocol (DHCP) server 162, is connected in WWAN core network 136 for assigning IP addresses of a public IP pool to mobile devices operating in WWAN 104. A WWAN (e.g. cellular) access gateway 142 (or, more generally, call control equipment) may be provided in order to facilitate communication switching operations (e.g. roaming, handovers) between WLAN 102 and WWAN 104 at least in some situations.

A client terminal 106 is also shown as operating and/or connected in the LAN 110. Client terminal 106 is shown to have one or more processors 120, a WLAN radio interface 122 coupled to one or more processors 120, and an antenna means 125 coupled to WLAN radio interface 122. Client terminal 106 may be a mobile communication device (e.g. a mobile handheld communication device) which has the same or similar make, construction, and/or operation as mobile station 108. Client terminal 106 operates to maintain communications with WLAN 102 through its WLAN radio interface 122. In particular, WLAN radio interface 122 is associated with and maintains communications with access point 112 of WLAN 102 over a wireless link 190. As in this scenario WLAN 102 is an IEEE 802.11 network, WLAN radio interface 122 operates in accordance with the pertinent IEEE 802.11 standard of WLAN 102 as a client terminal.

In one embodiment, client terminal 106 may be a terminal that is fixed in position and not a mobile handheld device. In such case, client terminal 106 may further include a LAN communication interface 124. If provided, LAN communication interface 124 is connected to LAN 110 for communications between client terminal 106 and LAN 110. LAN communication interface 124 may be a reliable wired communication interface having a wired connection 195 between client terminal 106 and LAN 110. For example, LAN communication interface 124 may be an Ethernet interface compliant with the IEEE 802.3 standard, where wired connection 195 is an Ethernet connection. Being connected to LAN 110 via wired connection 195, client terminal 106 is typically fixed in position in LAN 110. In such embodiments, client terminal 106 may be a printer, a facsimile machine, or other fixed network equipment.

In the present techniques, client terminal 106 is further utilized to facilitate vertical handovers between WLAN 102 and WWAN 104 for mobile communication devices operating in WLAN 102. More particularly, client terminal 106 is configured to operate in a virtual access point (VAP) mode as one of the access points in WLAN 102. For this purpose, client terminal 106 is configured for peer-to-peer (P2P) communications with other client terminals and for bridging to WLANs. Note that the P2P communications may be enabled on client terminal 106 all of the time, or enabled in response to any suitable predetermined condition, such as a detected environmental or network condition. Client terminal 106 may also be configured to perform mesh networking functions, such as pathfinding/discovery and bridge/routing updating functions. In one embodiment, client terminal 106 is operative in accordance with WiFiDirect standards to perform one or more of such functions. Alternatively, client terminal 106 may be operative in accordance with IEEE 802.11s standards to perform one or more of such functions. Note that client terminal 106 may serve not one, but rather all, suitable mobile devices operating in WLAN 102 for vertical handover purposes as described herein.

Figure 2:
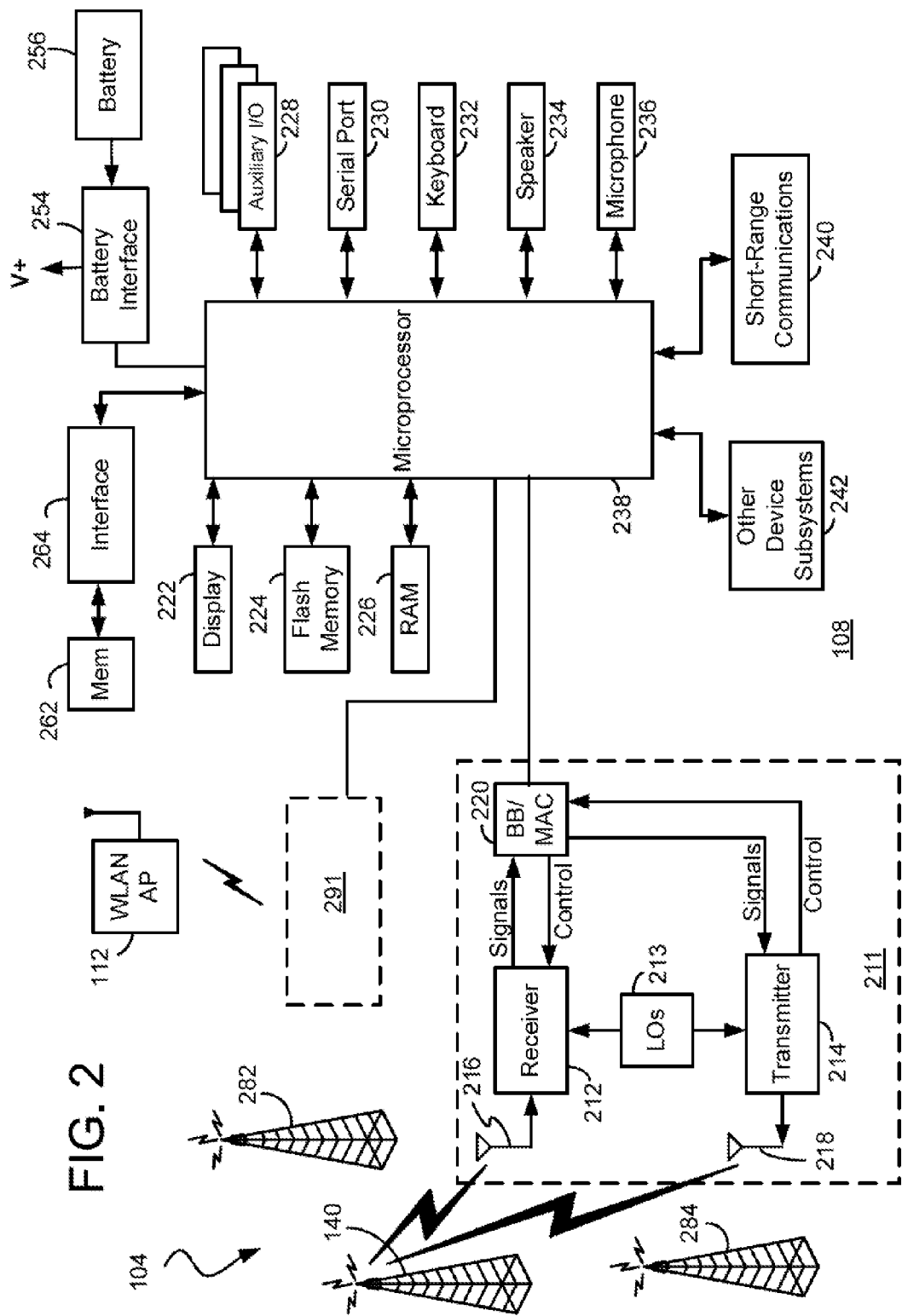
FIG. 2 is a schematic diagram of the mobile communication device (e.g. a mobile station (MS)) which is operative in both the WLAN and the WWAN of FIG. 1.

Referring now to FIG. 2, electrical components of a typical mobile communication device 108 (e.g. a mobile station or handheld wireless handset) which operates in both WLANs and WWANs of FIG. 1 are now described. Mobile device 108 is preferably a two-way communication device having at least voice and advanced data communication capabilities, including the capability to communicate with other computer systems. Depending on the specific functionality and options provided by mobile device 108, it may be referred to as a data messaging device, a two-way pager, a cellular telephone with data messaging capabilities, a wireless Internet appliance, or a data communication device (with or without telephony capabilities).

Preferably, mobile device 108 is a wireless handset which operates in accordance with both a WWAN or cellular network interface standard (e.g. GSM/GPRS standards) and a WLAN or IEEE 802.11 standard. As shown in FIG. 2, mobile device 108 is adapted to wirelessly communicate with WWAN 104 via a plurality of base stations 140, 282, and 284 utilizing a communication subsystem 211. Mobile device 108 is also adapted to wirelessly communicate with WLANs via a plurality of wireless APs, such as wireless AP 112, utilizing a communication subsystem 291. With such configuration, mobile device 108 may be referred to as a "dual mode" mobile device. Although mobile device 108 may have separate and independent subsystems for these purposes, at least some portions or components of these otherwise different subsystems may be shared where possible.

Communication subsystem 211 for the WWAN includes a receiver 212, a transmitter 214, and associated components, such as one or more (preferably embedded or internal) antenna elements 216 and 218, local oscillators (LOs) 213, and a DSP 220. As will be apparent to those skilled in the field of communications, the particular design of communication subsystem 211 depends on the communication network in which mobile device 108 is intended to operate. Mobile device 108 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These processed signals are input to transmitter 214 for digital-to-analog (D/A) conversion, frequency up conversion, filtering, amplification and transmission through the network via antenna 218. DSP 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Communication subsystem 291 for the WLAN has components similar to those in communication subsystem 211 for the WWAN (including its associated processor/processing components), but are operative in accordance with IEEE 802.11 standards. For communication subsystem 291, DSP 220 may be replaced with a processing module referred to as a baseband (BB) and media access control (MAC) processing module.

Since mobile device 108 may be a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 108 includes a microprocessor 238 (one type of processor or controller) that controls overall operation of mobile device 202. This control includes the network transitioning techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 108. A predetermined set of applications that control basic device operations, including at least data and voice communication applications, will normally be installed on mobile device 108 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 (denoted as "Mem" in the FIG. 2) to facilitate storage of PIM data items and other information.

The PIM application preferably has the ability to send and receive data items via the wireless network. The PIM data items may be seamlessly integrated, synchronized, and updated via the wireless network, with the wireless device user's corresponding data items stored and/or associated with a host computer system thereby creating a mirrored host computer on mobile device 108 with respect to such items. This is especially advantageous where the host computer system is the wireless device user's office computer system. Additional applications may also be loaded onto mobile device 108 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 108 and may provide enhanced on-device functions, communication-related functions, or both. For example, secure communication applications may enable electronic commerce functions and other such financial transactions to be performed using mobile device 108.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 108 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications (e.g. VoIP calls), the overall operation of mobile device 108 is substantially similar, except that the received signals would be output to speaker 234 and signals for transmission would be generated by microphone 236. Alternative voice or audio I/O subsystems, such as a voice message recording subsystem, may also be implemented on mobile device 108. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 108 by providing for information or software downloads to mobile device 108 other than through a wireless communication network. The alternate download path may, for example, be used to load an encryption key onto mobile device 108 through a direct and thus reliable and trusted connection to thereby provide secure device communication. Short-range communications subsystem 240 of FIG. 2 is an additional optional component that provides for communication between mobile device 108 and different systems or devices, which need not necessarily be similar devices. For example, subsystem 240 may include an infrared device and associated circuits and components, or a BLUETOOTH® communication module to provide for communication with similarly enabled systems and devices. BLUETOOTH® is a registered trademark of Bluetooth SIG, Inc.

Although a specific mobile device 108 has just been described, any suitable mobile communication device or terminal may be part of the inventive methods and apparatus which will be described in fuller detail below.

Figure 3:
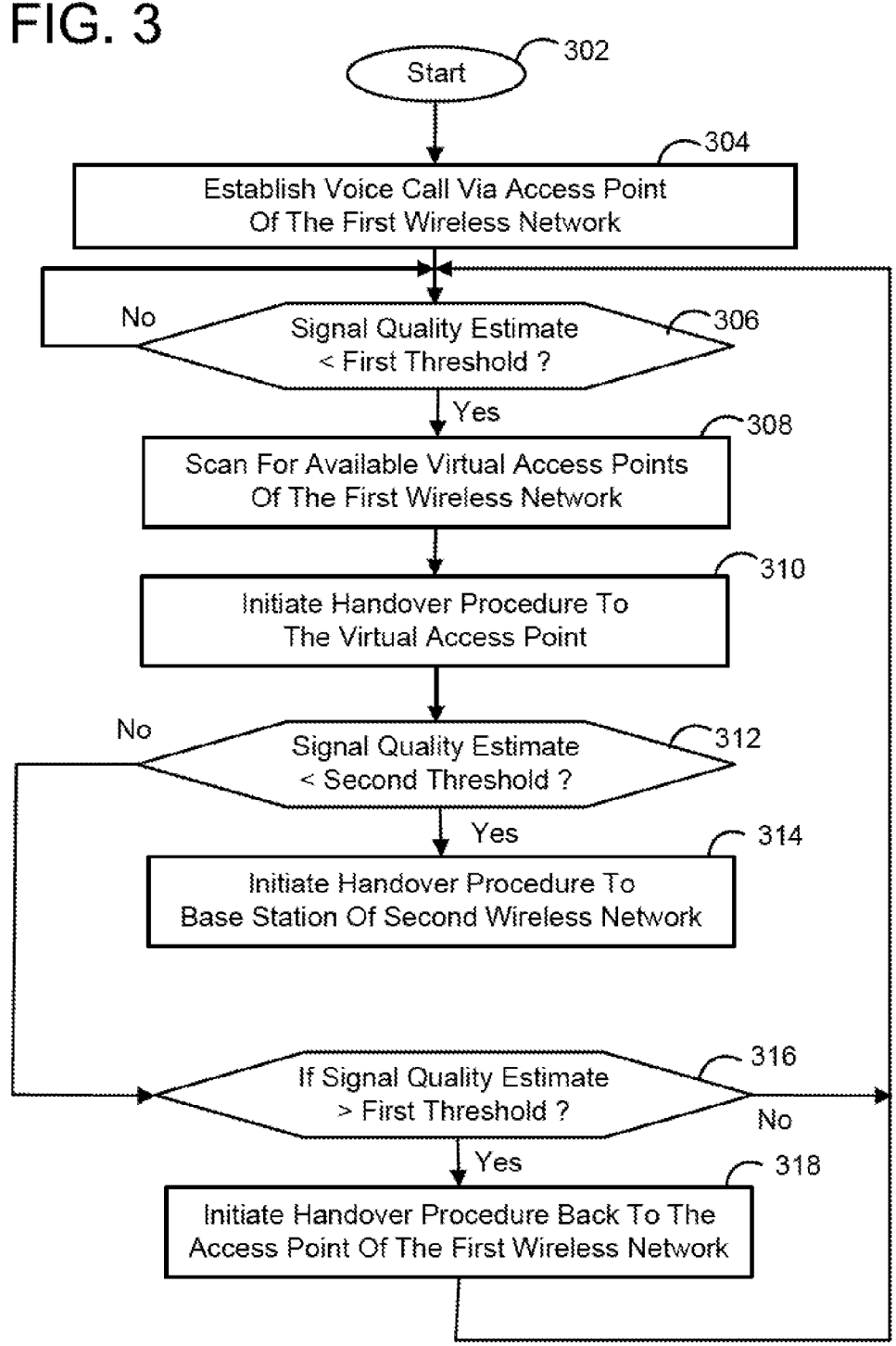
FIG. 3 is a flowchart which describes a mobile device method for use in improving network coverage, for voice or data calls, with use of the client terminal which operates as a virtual access point in the WLAN.

FIG. 3 is a flowchart which describes techniques for use in reducing false triggering of vertical handovers of voice or data calls. Certain aspects of the techniques may be performed by mobile device 108 of the LAN 110 in FIG. 1, and other certain aspects of the techniques may be performed by a network entity, such as an AP and/or AP controller, in connection with client terminals which may serve as virtual access points.

Any such technique described in relation to FIG. 3 may be embodied as a computer program product which includes a computer readable medium (e.g. computer memory, disk or diskette, CD-ROM, etc.) and computer instructions stored in the computer readable medium for use in being executed by one or more processors (e.g. processors of the mobile device and/or the network entity). The computer instructions are configured in accordance with the logic described herein.

To better illustrate these techniques, the flowchart of FIG. 3 will be described together in relation to FIGS. 4-6, which are illustrations of the communication system of FIG. 1 presented in a chronological sequence according to the flowchart of FIG. 3. As an overview, in FIG. 4, a first state is represented where a voice or data call established between mobile device 108 operating in the WLAN 102 and another communication device 180; in FIG. 5 a second state is represented showing the call being handed over to a virtual access point (e.g. client terminal 106) of the WLAN 102; and in FIG. 6 a third state is represented showing the call being handed over "vertically" from the WLAN 102 to the WWAN 104.

To begin, the mobile device initially enters and operates in a WLAN of a communication network. To do this, the mobile device identifies a particular wireless access point (AP) of the WLAN, associates with the selected wireless AP, and performs any authentication procedures necessary with the WLAN to gain access to services (e.g. VoIP and data services) provided in the network. Beginning at a start block 302 of FIG. 3, the mobile device establishes and maintains a communication session with another communication device via the access point of the WLAN (step 304 of FIG. 3). The communication session may be a voice or a data call, or the like.

Figure 4:
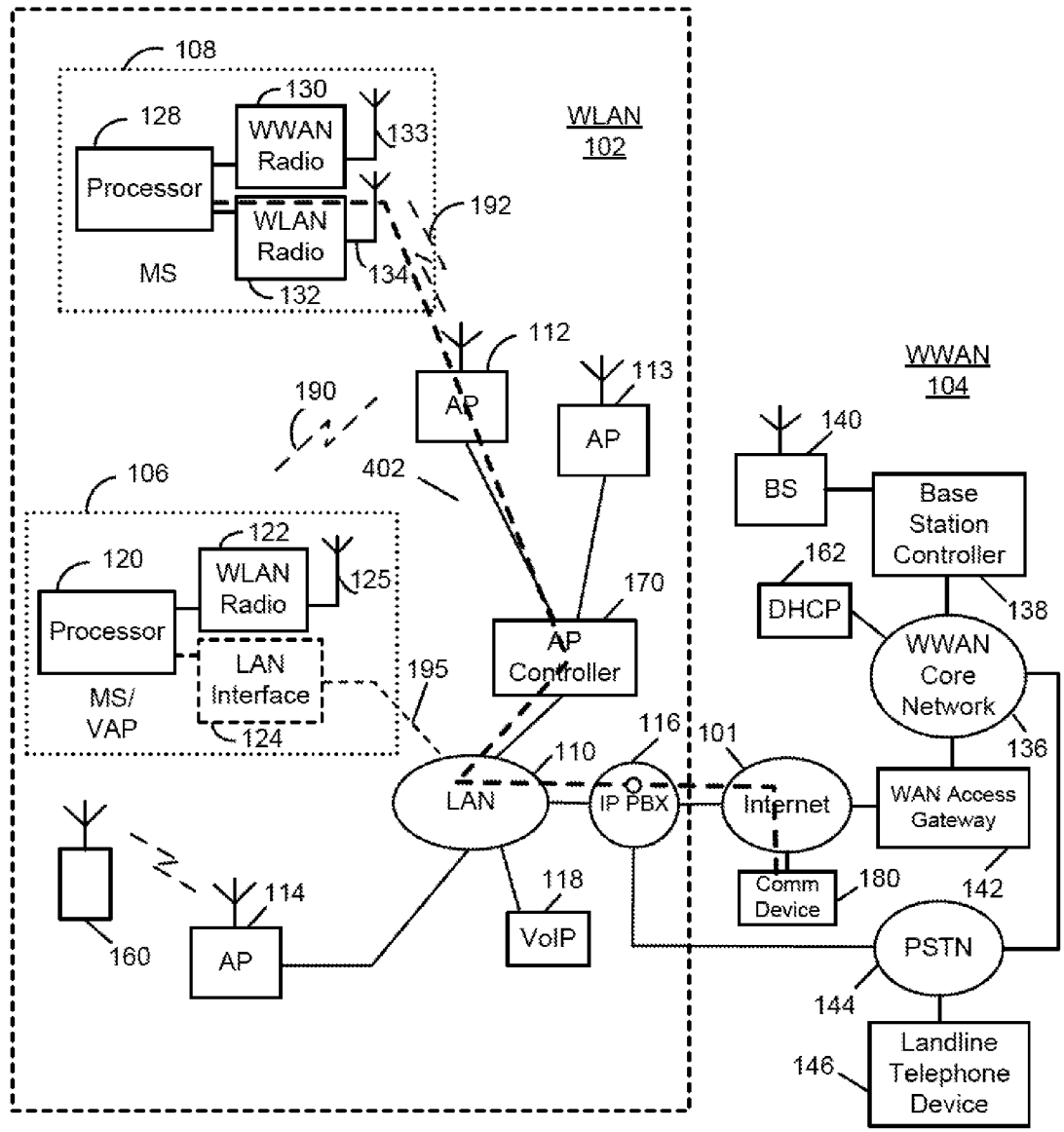
FIGS. 4-6 are illustrations of the communication system of FIG. 1 presented in sequence according to the flowchart of FIG. 3, where in FIG. 4 a first state is represented showing a voice or data call established between the mobile device operating in the WLAN and another communication device, and in FIG. 5 a second state is represented showing the call being handed over to the virtual access point of the WLAN, and in FIG. 6 a third state is represented showing the call being handed over "vertically" from the virtual access point of the WLAN to a base station of the WWAN.

This first state (i.e. at step 304 of FIG. 3) is illustrated in FIG. 4, where the mobile device is mobile device 108, the other communication device in the communication session is communication device 180, and the communication session may be a voice call such as a VoIP call. The voice call is represented in FIG. 4 by a call connection 402 which is established through LAN 110 and WLAN 102. Mobile device 108 receives and transmits voice data of the voice call via the access point 112 of the WLAN 102 as is conventional. Note that the voice call is initially established as two separate call legs between mobile device 108 in WLAN 102 and communication device 180 via IP-PBX controller 116 (or "gateway") (see e.g. FIG. 4).

During the call, the mobile device continually monitors whether it is losing radio frequency (RF) coverage with AP(s) of the WLAN. To do this, the mobile device continually monitors a signal quality estimate of communications with the AP(s). The signal quality estimate may be calculated or obtained based on signal conditions on the receive side (downlink), the transmitter side (uplink), or both. For example, on the downlink, the signal quality estimate may be calculated or obtained based on a received signal strength indicator (RSSI) of a received signal from the access point. On the uplink, the signal quality estimate may be calculated or obtained based on the number of data packet transmission errors and/or data packet retries (i.e. a count thereof). Alternatively, the signal strength could be estimated by monitoring the uplink and downlink data rates that were successfully used to transmit and receive traffic.

The mobile device tests whether the signal quality estimate is below a first quality threshold (step 306 of FIG. 3). If the signal quality estimate is below the first quality threshold as tested in step 306 (and e.g. no other access points of the WLAN are available), then the mobile device will attempt to handover to a virtual access point in the WLAN. A virtual access point is a client terminal of the WLAN which further operates as an access point. Note that such virtual access point may alternatively be referred to as a soft AP (SAP), or more generally as a wireless termination point (WTP).

In the present embodiment, the mobile device may scan for or otherwise identify available virtual access points in the WLAN (step 308 of FIG. 3), and then perform a handover procedure for handing over the call to the identified virtual access point (step 310 of FIG. 3). Thereafter, the call is handed over to the virtual access point for maintaining the call in the WLAN via the virtual access point. Note that the mobile device may select from one of any number of available virtual access points made available in the WLAN. Note that, if no suitable virtual access points are identified in step 308, then the flowchart may proceed directly to step 312 of FIG. 3.

Figure 5:
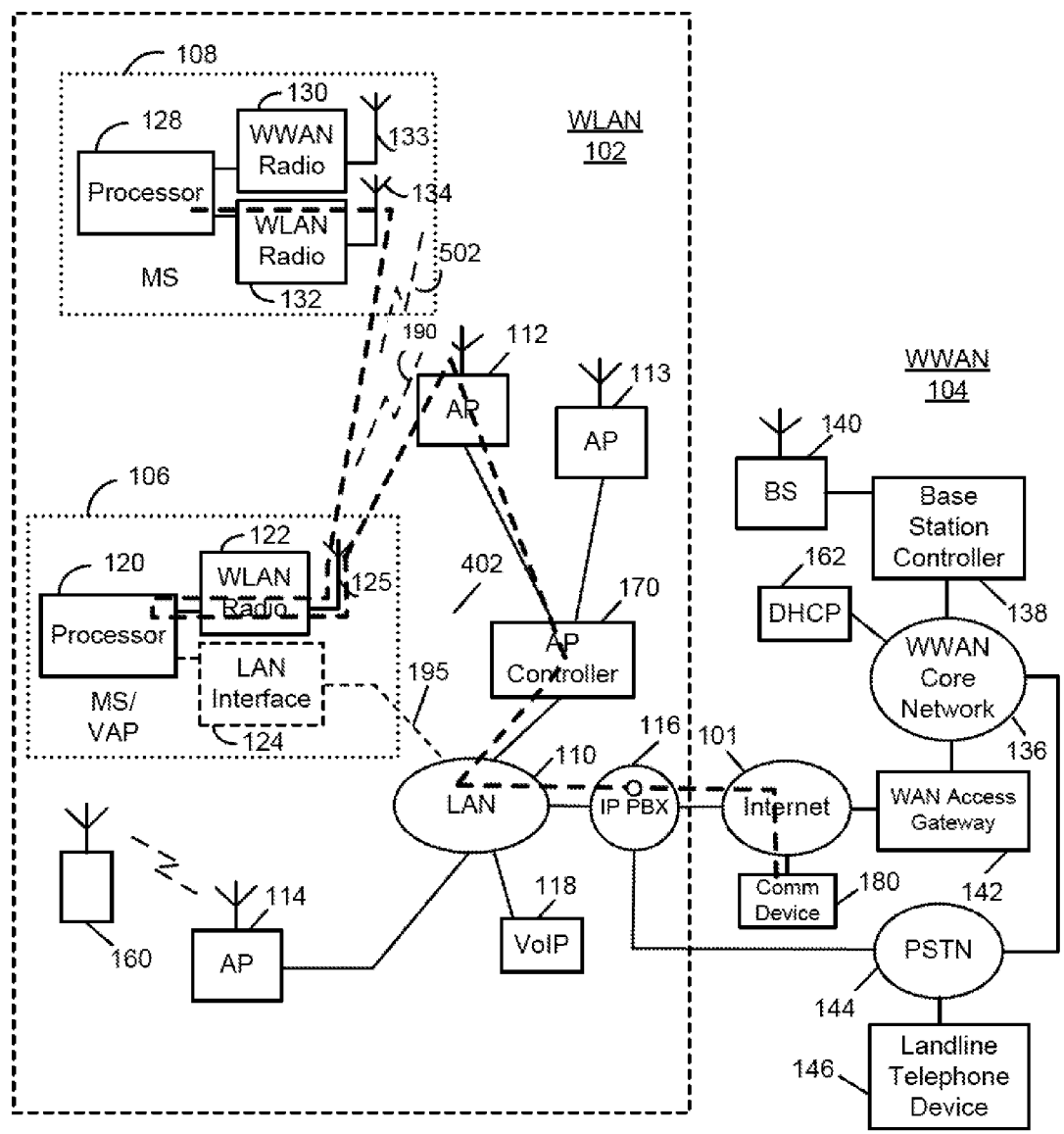

The second state (i.e. at step 310 of FIG. 3) is illustrated in FIG. 5, where client terminal 106 is the virtual access point that is selected for handover of the call involving mobile device 106. Here, mobile device 108 is associated with and communicates with client terminal 106 over a wireless link 502, and client terminal 106 operates in a peer-to-peer (P2P) mode of operation with mobile device 106 while being bridged to the WLAN via access point 112 over wireless link 190. Thus, mobile device 108 maintains the call, receives and transmits data of the call, via the virtual access point of the WLAN 102. The data traffic for the call may be bridged directly to the LAN 110, or indirectly tunneled through AP controller 170 to the LAN 100, which may be required when the AP resides on a different subnet than the client terminal (i.e. the data traffic is tunneled back through the AP controller 170 so that the client terminal does not experience any IP connectivity issues).

Note that these actions of 306, 308, and 310 are performed in attempt to maintain the call in the WLAN without prematurely performing "vertical" handover to the WWAN. For example, the signal degradation detected by the mobile device may only be a brief temporary fade due to the vagaries of RF propagation.

In one embodiment, the client terminal may be set as the virtual access point by the AP controller of the WLAN in accordance with the Control and Provisioning of Wireless Access Point (CAPWAP) protocol. This client terminal serving as the virtual access point may be configured to perform mesh networking functions, such as pathfinding/discovery and bridge/routing updating functions. The client terminal which serves as the virtual access point may be further operative in accordance with WiFiDirect standards to perform one or more of such functions or, alternatively, operative in accordance with IEEE 802.11s standards to perform one or more of such functions.

Any client terminal that is able to serve as a VAP may initially register with the AP controller as a VAP and/or CAPWAP-enabled device. At the appropriate time (e.g. when a need for additional AP coverage is detected), the AP controller may enable (or disable) a client terminal as a VAP in accordance with CAPWAP for the purpose facilitating handover processing as described. In one example, the client terminal may send to the AP controller a request to operate as a VAP in the WLAN, and thereafter operate as a VAP in response; this may be done upon entry into the WLAN or anytime during operation in the WLAN. As another example, the AP controller may regularly monitor network conditions and control (whether or not, and/or which) client terminal(s) to be enabled/disabled as VAPs based on the monitoring to improve network coverage or facilitate handover processing as described. More particularly, the AP controller may regularly monitor network conditions which may be or include the amount and/or types of data traffic in the WLAN, wireless resource utilization in the WLAN, and the number of client terminals being served in WLAN 102, as examples, for such control.

The AP controller may send configuration information to the client terminal(s) for configuring the client terminal as the VAP. This configuration information may include infrastructure security settings, Quality of Service (QoS) settings, and data routing information, and enables the client terminal to behave as any other AP in the WLAN. Also, at any given time, the AP controller (or, more particularly, a radio resource management or RRM component of the AP controller) may determine when there is a coverage gap for a particular client terminal. In response, the AP controller sends a basic service set (BSS) transition report to the particular client terminal that is experiencing the coverage gap. The transition report may include an identification of the VAP as an option for call handover. The client terminal may thereafter select the appropriate VAP for call handover.

Referring back to the flowchart of FIG. 3, the mobile device performs additional operations while maintaining the call via the virtual access point of the WLAN from step 310. Continually monitoring the signal quality estimate, the mobile device tests whether the signal quality estimate is below a second quality threshold (step 312 of FIG. 3). The second quality threshold is set to be less than the first quality threshold. If the signal quality estimate is below the second quality threshold as tested in step 312, then the mobile device performs a vertical handover procedure to a base station of the WWAN (step 314 of FIG. 3). Thereafter, the call is handed over to the base station of the WLAN for maintaining the call in the WWAN.

Figure 6:
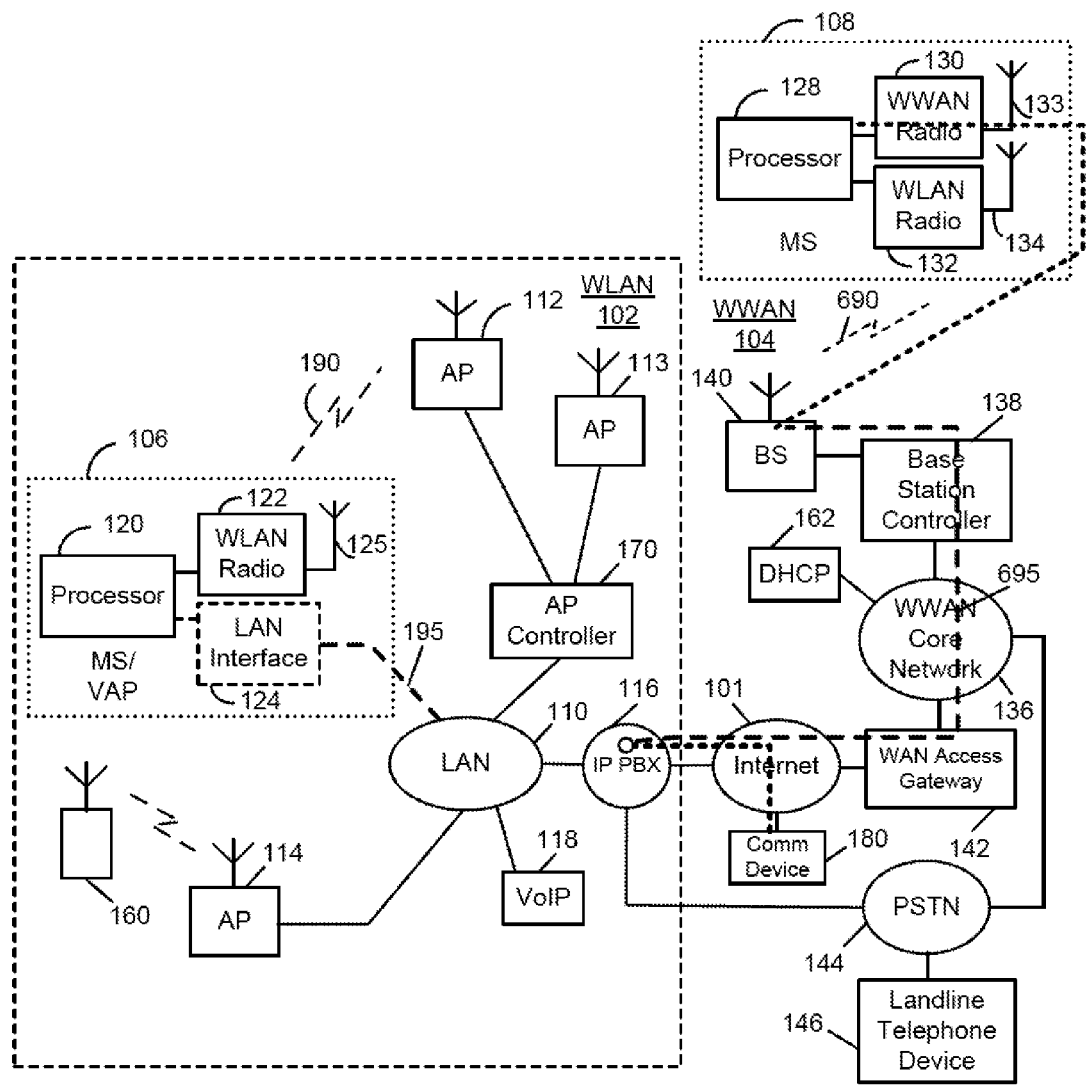

This third state (i.e. at step 314 of FIG. 3) is illustrated in FIG. 6, where base station 104 of WWAN 104 is selected for handover of the call involving mobile device 106. Here, mobile device 108 communicates with base station 104 a wireless link 690 via WWAN radio interface 130. Call connection 402 (FIG. 5) within the WLAN is replaced with a call connection 695 which traverses through WWAN 104 (i.e. extending from base station controller 138, WWAN core network 136, WAN access gateway 142, Internet 101, to IP-PBX controller 116). Thus, mobile device 108 maintains the call, receives and transmits data of the call, via base station 140 of WWAN 104. Note that mobile device 108 may enable its WWAN radio interface 130, if not previously enabled, so that it may communicate with the WWAN 104. Also optionally, mobile device 108 may also disable its WLAN radio interface 132 as communications from WLAN 102 may be severely degraded or non-existent.

Referring back to the flowchart of FIG. 3, if signal quality estimate is detected to be above the second quality threshold as tested in step 312, then the mobile device refrains from performing vertical handover to the WWAN but instead proceeds to step 316 of FIG. 3. The mobile device tests whether the signal quality estimate is back above the first quality threshold (step 316 of FIG. 3). If the signal quality estimate is detected to be back above the first quality threshold value as tested in step 316, then the mobile device performs a handover procedure for handing over the call from the virtual access point of the WLAN back to the access point of the WLAN (step 318 of FIG. 3). Thereafter, the call is handed back over to the access point for maintaining the call in the WLAN via the access point. See again e.g. FIG. 4. Such actions of 316 and 318 are also performed in attempt to maintain the call in the WLAN without prematurely performing "vertical" handover to the WWAN. Note that the mobile device may alternatively handover to a different access point of the WLAN in step 318 (e.g. an access point having a between signal quality than the other access point). If the signal quality estimate is detected to still be below the first quality threshold value as tested in step 316, then the mobile device will proceed back to step 306.

Note that the scanning which may be performed in step 308 of FIG. 3 may be a local scanning or a network-aided scanning. With local scanning, the mobile device may scan for client terminals which are serving as virtual access points. In one embodiment, the mobile device may operate to perform scanning on a single frequency which matches the frequency of communications with the currently-serving access point. In such embodiment, the virtual access point bridges with the access point on the same frequency as the mobile device and other terminals. With network-aided scanning, the network may regularly push (or provided upon request) a list of available virtual access points for mobile devices to utilize.

Note that although the call and handover technique has been described with respect to communication device 180 on the Internet 101, the technique may be similarly performed with respect to a different type of communication device such as landline telephone device 146 in PSTN 144 without the use of WAN access gateway.

Thus, methods and apparatus in a mobile communication device for use in improving network coverage for voice or data calls, such as for reducing false triggers for vertical handover between first and second wireless networks, have been described. For this purpose, at least one client terminal is set to operate as a virtual access point in the first wireless network by an AP controller. When serving as the virtual access point, the client terminal may be configured for peer-to-peer (P2P) communications and be bridged to the first wireless network. In one embodiment, the client terminal is set to operate as the virtual access point by the AP controller in accordance with the CAPWAP protocol. The client terminal serving as the virtual access point may be configured to perform mesh networking functions, such as pathfinding/discovery and bridge/routing updating functions. Such client terminal may be further operative in accordance with WiFi-Direct standards, or IEEE 802.11s standards.

According to the technique, if the mobile device detects that a signal quality estimate of communications via an access point of the first wireless network is below a first quality threshold value, then the mobile device performs a handover procedure for handing over the call to the virtual access point which is bridged to the first wireless network. While maintaining the voice or the data call via the virtual access point, if the mobile device detects that the signal quality estimate is back above the first quality threshold value, then the mobile device performs a handover procedure for handing over the call back to the access point of the first wireless network. On the other hand, if the mobile device detects that the signal quality estimate is below a second quality threshold value which is less than the first quality threshold value, then the mobile device performs a vertical handover procedure for handing over the call from the virtual access point of the first wireless network to a base station of the second wireless network.

The above-described embodiments of the present application are intended to be examples only. For example, the embodiments of the present disclosure were described with respect to the case where the WLAN was an IEEE 802.11-based network and the WWAN was a cellular telecommunications network. However, the WLAN and WWAN may be networks different from those networks, as long as the WLAN type network covers a smaller region relative to the WWAN type network. For example, one of the networks may be a WiMAX network, and the other network may be a cellular network or an IEEE 802.11-based network. Alternatively, for example, one of the networks may be a BLUETOOTH®-based network, and the other network may be a cellular network or an IEEE 802.11-based network. As another example, although the embodiments of the present disclosure were described with respect to WLAN-to-WWAN transitioning for voice calls, the techniques may similarly to other types of (real-time) media streams for other types of data connections, such as video and/or audio media over data connections or calls. Those of skill in the art may affect alterations, modifications and variations to the particular embodiments without departing from the scope of the application. The invention described herein in the recited claims intends to cover and embrace all suitable changes in technology.

The invention claimed is:

1. A method in a mobile communication device for use in reducing false triggering of a vertical handover of a voice or a data call from a wireless local area network "WLAN" to a wireless wide area "WWAN", the method comprising:
   maintaining the call via an access point of the WLAN;
   when a signal quality estimate of communications via the access point of the WLAN is detected to be below a first quality threshold value:
   identifying an available virtual access point of the WLAN;

maintaining the call in the WLAN without prematurely performing a vertical handover procedure for handing over the call to the WWAN;

performing a handover procedure for handing over the call to the virtual access point of the WLAN, the virtual access point comprising a client terminal which is bridged to the WLAN;

maintaining the call via the virtual access point using peer-to-peer communications with the client terminal;

while maintaining the call via the virtual access point of the WLAN:

when the signal quality estimate is detected to be below a second quality threshold value which is less than the first quality threshold value, performing a vertical handover procedure for handing over the call from the virtual access point of the WLAN to a base station of the WWAN; and when the signal quality estimate is detected to be back above the first quality threshold value, indicating a fade in the WLAN performing a handover procedure for handing over the call from the virtual access point of the WLAN back to the access point of WLAN.

2. The method of claim 1, wherein the client terminal is set as the virtual access point by an AP controller in accordance with a Control and Provisioning of Wireless Access Points "CAPWAP" protocol.

3. The method of claim 1, wherein the act of performing the handover procedure to the virtual access point comprises a client terminal operative in accordance with Wi-Fi Direct or IEEE 802.11s standards.

4. The method of claim 1, further comprising:
calculating the signal quality estimate based on a received signal strength indicator "RSSI" of a received signal from the access point.

5. The method of claim 1, further comprising:
when the signal quality estimate is detected to be below the first quality threshold value, scanning to identify an available virtual access point in the WLAN prior to performing the handover procedure for handing over the call to the virtual access point.

6. The method of claim 1, wherein the acts of maintaining the call in the WLAN and performing the handover procedure for handing over the call to the virtual access point of WLAN are performed when the signal quality estimate of the communications via the access point is detected to be below the first quality threshold value and no other access points of the WLAN are available for communications.

7. The method of claim 1, wherein the WWAN comprises a cellular telecommunications network.

8. The method of claim 1, further comprising:
sending, by the client terminal to the AP controller, a request to operate as the virtual access point; and
the client terminal being set as the virtual access point by the AP controller in response to sending the request to the AP controller.

9. The method of claim 1, further comprising:
monitoring, by the AP controller, network conditions of the WLAN; and
setting the client terminal as the virtual access point based on the monitoring.

10. A mobile communication device configured to maintain a voice or a data call in one of a wireless local area network "WLAN" or a wireless wide area network "WWAN", the mobile communication device comprising:
a first radio frequency "RF" transceiver operative for communications via the WLAN;
a second RF transceiver operative for communications via the WWAN;
one or more processors coupled to the first and the second RF transceivers; and
the one or more processors being operative to:
maintain the call via an access point of the WLAN;
when a signal quality estimate of communications via the access point of the WLAN is detected to be below a first quality threshold value:
identify an available virtual access point of the WLAN;
maintain the call in the WLAN without prematurely performing a vertical handover procedure for handing over the call to the WWAN;
perform a handover procedure for handing over the call to the virtual access point of the WLAN, the virtual access point comprising a client terminal which is bridged to the WLAN;
maintain the call via the virtual access point using peer-to-peer communications with the client terminal;
while maintaining the call via the virtual access point of the WLAN:
when the signal quality estimate is detected to be below a second quality threshold value which is less than the first quality threshold value, perform a vertical handover procedure for handing over the call from the virtual access point of the WLAN to a base station of the WWAN; and when the signal quality estimate is detected to be back above the first quality threshold value, indicating a fade in the WLAN, perform a handover procedure for handing over the call from the virtual access point of the WLAN back to the access point of WLAN.

11. The mobile communication device of claim 10, wherein the client terminal is set as the virtual access point by an AP controller in accordance with a Control and Provisioning of Wireless Access Points "CAPWAP" protocol.

12. The mobile communication device of claim 10, wherein the one or more processors are operative to perform the handover procedure to the virtual access point which is a client terminal operative in accordance with Wi-Fi Direct or IEEE 802.11s standards.

13. The mobile communication device of claim 10, wherein the one or more processors are operative to calculate the signal quality estimate based on a received signal strength indicator (RSSI) of a received signal from the access point.

14. The mobile communication device of claim 10, wherein the WWAN comprises a cellular telecommunications network.

15. The mobile communication device of claim 10, wherein the herein the voice or the data call comprises a voice over IP (VoIP) call.

16. A communication system comprising a plurality of client terminals operative for communications in a wireless local area network "WLAN", and a wireless wide area network "WWAN", wherein one of the client terminals comprises a mobile communication device operative to:
maintain the call via an access point of the WLAN;
when a signal quality estimate of communications via the access point of the WLAN is detected to be below a first quality threshold value:
identify an available virtual access point of the WLAN;
maintain the call in the WLAN without prematurely performing a vertical handover procedure for handing over the call to the WWAN;

perform a handover procedure for handing over the call to the virtual access point of the WLAN, the virtual access point comprising a client terminal which is bridged to the WLAN;

maintain the call via the virtual access point using peer-to-peer communications with the client terminal;

while maintaining the call via the virtual access point of the WLAN:

when the signal quality estimate is detected to be below a second quality threshold value which is less than the first quality threshold value, perform a vertical handover procedure for handing over the call from the virtual access point of the WLAN to a base station of the WWAN; and when the signal quality estimate is detected to be back above the first quality threshold value, indicating a fade in the WLAN, perform a handover procedure for handing over the call from the virtual access point of the WLAN back to the access point of WLAN.

17. The communication system of claim 16, wherein the mobile communication device is further operative to invoke the handover procedure to the virtual access point which is a client terminal operative in accordance with Wi-Fi Direct or IEEE 802.11s standards.

18. The communication system of claim 16, wherein the mobile communication device is further operative to calculate the signal quality estimate based on a received signal strength indicator (RSSI) of a received signal from the access point.

19. The communication system of claim 16, wherein the WWAN comprises a cellular telecommunications network.

20. The communication system of claim 16, wherein the voice or the data call comprises a voice over IP (VoIP) call.

* * * * *